United States Patent
Lee (10) Patent No.: US 11,948,408 B2
(45) Date of Patent: Apr. 2, 2024

(54) APPARATUS AND METHOD FOR EVALUATING VEHICLE SENSOR PERFORMANCE

(71) Applicants: Hyundai Motor Company, Seoul (KR); Kia Motors Corporation, Seoul (KR)

(72) Inventor: Wooyoung Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 445 days.

(21) Appl. No.: 16/832,454

(22) Filed: Mar. 27, 2020

(65) Prior Publication Data

US 2021/0183181 A1 Jun. 17, 2021

(30) Foreign Application Priority Data

Dec. 16, 2019 (KR) .................. 10-2019-0167578

(51) Int. Cl.
*G07C 5/08* (2006.01)
*G01S 7/40* (2006.01)
*G01S 13/93* (2020.01)
*G01S 13/931* (2020.01)
*G01S 19/01* (2010.01)

(52) U.S. Cl.
CPC .............. *G07C 5/0808* (2013.01); *G01S 7/40* (2013.01); *G01S 13/931* (2013.01); *G01S 19/01* (2013.01)

(58) Field of Classification Search
CPC ....... G07C 5/0808; G01S 7/40; G01S 13/931; G01S 19/01; G01M 99/008; G06F 11/34; G06T 7/20
See application file for complete search history.

(56) References Cited

U.S. PATENT DOCUMENTS

| | | | |
|---|---|---|---|
| 10,613,546 B2 * | 4/2020 | Aghamohammadi | G05D 1/0251 |
| 2018/0095103 A1 * | 4/2018 | Hirai | B60W 60/001 |
| 2019/0317204 A1 * | 10/2019 | Zhang | G01S 13/726 |
| 2020/0001877 A1 * | 1/2020 | Burca | B60W 30/18163 |
| 2020/0353942 A1 * | 11/2020 | Abt | G01S 15/931 |
| 2021/0348943 A1 * | 11/2021 | Hosoi | G09B 29/00 |

* cited by examiner

*Primary Examiner* — Bernarr E Gregory
*Assistant Examiner* — Juliana Cross
(74) *Attorney, Agent, or Firm* — Fox Rothschild LLP (57) ABSTRACT

An apparatus and method for evaluating vehicle sensor performance are provided in which performances of various vehicle sensors are evaluated based on the same evaluation criteria. The apparatus estimates field of views (FoVs) of sensors based on acquired object information and divides each of the estimated FoVs into a plurality of grid cells. The object information corresponding to the respective grid cells is collected and mean errors and error variances of the object information are calculated. Performances of the sensors are then evaluated based on the calculated mean errors and error variances.

18 Claims, 6 Drawing Sheets

APPARATUS AND METHOD FOR EVALUATING VEHICLE SENSOR PERFORMANCE

CROSS-REFERENCE TO RELATED APPLICATION(S)

This application claims the benefit of Korean Patent Application No. 10-2019-0167578, filed on Dec. 16, 2019, which is hereby incorporated by reference as if fully set forth herein.

BACKGROUND

Field of the Disclosure

The present disclosure relates to an apparatus for evaluating vehicle sensor performance, and more particularly, to an apparatus and method for evaluating vehicle sensor performance based on the same evaluation criteria.

Discussion of the Related Art

In general, one of key points in technical development of autonomous vehicles and advanced driver assistance systems (ADASs) is technology for acquiring accurate and reliable information regarding a surrounding environment. Therefore, various methods for acquiring surrounding environmental information having high reliability are currently being developed, but reliability of the surrounding environmental information may still depend on performances of vehicle sensors.

For example, if surrounding environmental information is acquired by performing a multiple object tracking technique using a nearest neighbor filter (NNF), a probabilistic data association filter (PDAF), etc., or sensor fusion, reliability of the acquired surrounding environmental information may vary depending on vehicle sensor performance. Accordingly, the vehicle sensor performance has a substantial influence on reliability of the acquired surrounding environmental information.

In general, vehicle sensor performance may be determined based on evaluation results of vehicle sensor performance as provided by a sensor manufacturer. However, since the evaluation results of the vehicle sensor performance provided by the sensor manufacturer are result values measured under ideal circumstances, vehicle sensor performance in actual driving conditions may differ from the evaluation results of the vehicle sensor performance provided by the sensor manufacturer.

Further, since many sensor manufacturers have different evaluation criteria (e.g., different evaluation environments, performance evaluation units, acquired information, etc.), it may be difficult to determine design factors for sensor fusion. Therefore, the design factors are set using a trial and error method not using physical evidence, and it takes a substantial amount of time to set the design factors.

Accordingly, development of an apparatus for evaluating vehicle sensor performance, which may perform performance evaluation of various vehicle sensors based on the same evaluation criteria to increase accuracy and reliability of information acquired by the sensors, is required.

SUMMARY

Accordingly, the present disclosure provides an apparatus and method for evaluating vehicle sensor performance disclosure in which performances of various vehicle sensors may be evaluated based on the same evaluation criteria by calculating mean errors and error variances of object information based on grid cells of a field of view (FoV) of each sensor, to increase accuracy and reliability of information acquired by the sensors.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an apparatus for evaluating vehicle sensor performance may include a field of view (FoV) estimation unit configured to estimate FoVs of sensors based on acquired object information, a grid cell division unit configured to divide each of the estimated FoVs into a plurality of grid cells, an error calculation unit configured to collect the object information corresponding to the respective grid cells and to calculate mean errors and error variances of the object information, and a performance evaluation unit configured to evaluate performances of the respective sensors based on the calculated mean errors and error variances.

In another aspect of the present disclosure, a method for evaluating vehicle sensor performance in an apparatus for evaluating vehicle sensor performance may include estimating fields of view (FoVs) of sensors based on acquired object information, dividing each of the estimated FoVs into a plurality of grid cells, collecting the object information corresponding to the respective grid cells and calculating mean errors and error variances of the object information, and evaluating performances of the respective sensors based on the calculated mean errors and error variances. In yet another aspect of the present disclosure, a non-transitory computer readable recording medium having recorded thereon a program to execute the method.

In still yet another aspect of the present disclosure, a vehicle may include a sensing apparatus configured to sense object information regarding a target vehicle, and an apparatus configured to evaluate vehicle sensor performance configured to evaluate performance of the sensing apparatus by acquiring the object information regarding the target vehicle. The apparatus for evaluating vehicle sensor performance may include a field of view (FoV) estimation unit configured to estimate FoVs of sensors based on the acquired object information, a grid cell division unit configured to divide each of the estimated FoVs into a plurality of grid cells, an error calculation unit configured to collect the object information corresponding to the respective grid cells and to calculate mean errors and error variances of the object information, and a performance evaluation unit configured to evaluate performances of the respective sensors based on the calculated mean errors and error variances.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. However, the disclosure of the disclosure is not limited to the embodiments set forth herein, and may be variously modified. In the drawings, in order to clearly describe the present disclosure, descriptions of elements which are not related to the present disclosure will be omitted, and the same or similar elements are denoted by the same reference numerals even when they are depicted in different drawings.

In the following description of the exemplary embodiments, it will be understood that, when a part "includes" an element, the part may further include other elements and does not exclude presence of such other elements, unless stated otherwise. Further, in the following description of the embodiments, it will be understood that a suffix "part", "unit" or "module" means a unit to process at least one function or operation, and it may be implemented using hardware, software, or a combination of hardware and software.

Figure 1:
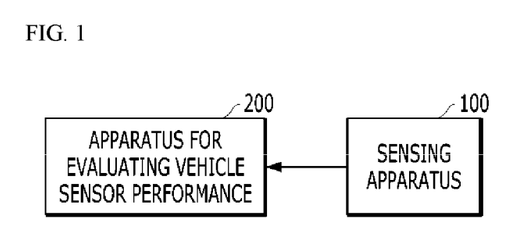
FIG. 1 is a block diagram illustrating a vehicle to which an apparatus for evaluating vehicle sensor performance according to an exemplary embodiment of the present disclosure is applied.

Hereinafter, with reference to FIGS. 1 to 8, an apparatus and method for evaluating vehicle sensor performance, to which exemplary embodiments of the present disclosure are applicable, will be described in detail. FIG. 1 is a block diagram illustrating a vehicle to which the apparatus for evaluating vehicle sensor performance according to the present disclosure is applied.

As shown in FIG. 1, an apparatus 200 for evaluating vehicle sensor performance according to the present disclosure may be applied to the inside of a vehicle, or be applied to the outside of the vehicle. For example, the vehicle may include a sensing apparatus 100 configured to sense object information regarding a target vehicle, and the apparatus 200 for evaluating vehicle sensor performance configured to evaluate performance of the sensing apparatus 100 by acquiring the object information regarding the target vehicle.

Particularly, the sensing apparatus 100 may include a radar, a camera and/or a lidar, without being limited thereto. The apparatus 200 for evaluating vehicle sensor performance may be configured to estimate fields of view (FoVs) of sensors based on the acquired object information, divide each of the estimated FoVs into a plurality of grid cells, collect the object information corresponding to the respective grid cells and calculate mean errors and error variances of the object information, and evaluate performances of the sensors based on the calculated mean errors and error variances.

In the estimation of the FoVs of the sensors, when a plurality of sensors mounted in the vehicle obtain information during movement of the target vehicle, the apparatus 200 may be configured to extract the object information regarding the target vehicle from the information acquired by the respective sensors, and estimate FoVs of the respective sensors based on the extracted object information regarding the target vehicle. Additionally, in the extraction of the object information regarding the target vehicle, the apparatus 200 may be configured to extract the object information regarding the target vehicle which passes FoV boundary areas while moving to all sections estimated to be the FoVs of the sensors.

Further, in the extraction of the object information regarding the target vehicle, the apparatus 200 may be configured to extract the object information regarding the target vehicle from the information acquired by the respective sensors using global positioning system (GPS) information regarding the target vehicle. Thereafter, when the FoVs of the sensors are estimated, the apparatus 200 may be configured to determine the size of the grid cells into which each of the FoVs is divided, and divide each of the FoVs into the grid cells based on the determined size.

In the calculation of the mean errors and error variances of the object information, the apparatus 200 may be configured to calculate mean errors and error variances of position and speed, among the object information. In addition, in evaluation of the performances of the sensors, the apparatus 200 may be configured to collect FoV performance information regarding the respective sensors based on the calculated mean errors and error variances, and evaluate accuracies and reliabilities of the respective sensors based on the collected FoV performance information regarding the respective sensors.

Figure 2:
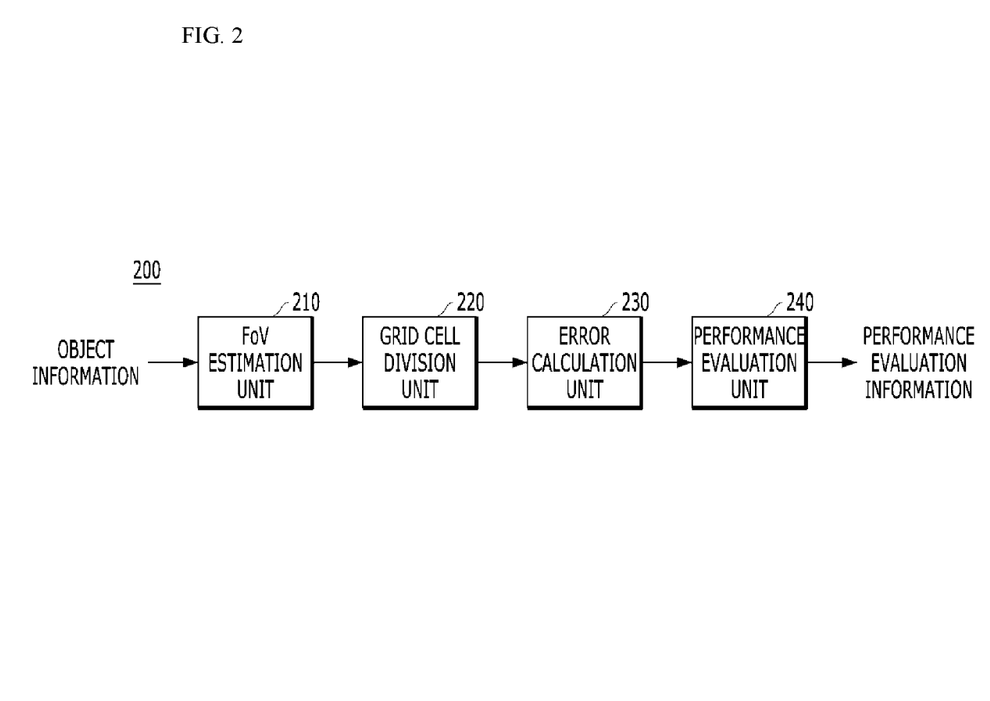
FIG. 2 is a block diagram illustrating the apparatus for evaluating vehicle sensor performance according to an exemplary embodiment of the present disclosure.
Figure 3:
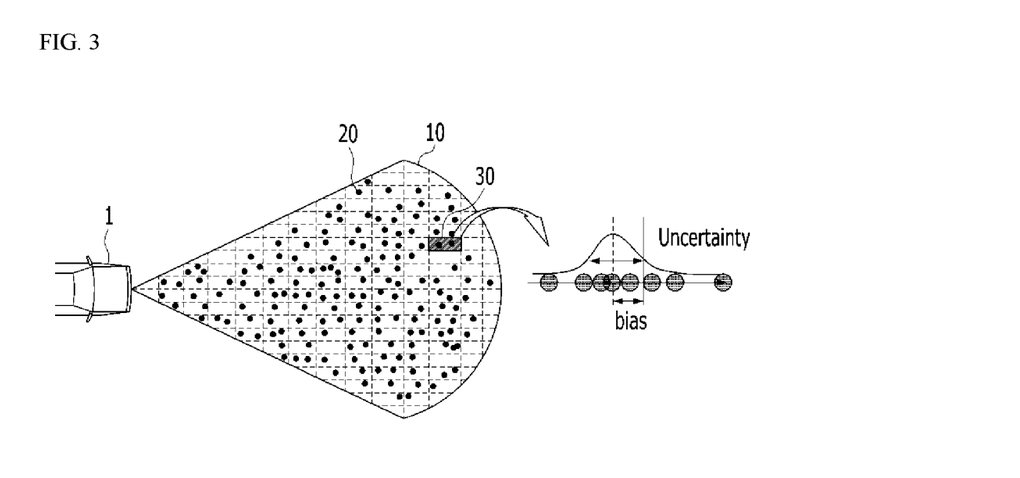
FIG. 3 is a view illustrating grid cells for describing a method for evaluating vehicle sensor performance according to an exemplary embodiment of the present disclosure.

FIG. 2 is a block diagram illustrating the apparatus for evaluating vehicle sensor performance according to the present disclosure, and FIG. 3 is a view illustrating grid cells for describing a method for evaluating vehicle sensor performance according to the present disclosure. The apparatus described herein below may be operated by a controller, that is, an overall controller having a processor and a memory.

As shown in FIGS. 2 and 3, the apparatus 200 for evaluating vehicle sensor performance according to the present disclosure may include an FoV estimation unit 210 configured to estimate FoVs 10 of the sensors based on the acquired object information, a grid cell division unit 220 configured to divide each of the estimated FoVs 10 into a plurality of grid cells 30, an error calculation unit 230 configured to collect object information 20 that corresponds to the respective grid cells 30 and to calculate mean errors and error variances of the object information 20, and a performance evaluation unit 240 configured to evaluate performances of the sensors based on the calculated mean errors and error variances.

Particularly, when a plurality of sensors installed within a host vehicle 1 acquires information during movement of a target vehicle 2, the FoV estimation unit 210 may be configured to extract object information regarding the target vehicle 2 from the information acquired by the respective sensors, and estimate the FoVs of the respective sensors based on the extracted object information regarding the target vehicle 2. In the extraction of the object information regarding the target vehicle 2, the FoV estimation unit 210 may be configured to extract the object information regarding the target vehicle 2 which passes the FoV boundary areas while moving to all sections estimated to be the FoVs 10 of the sensors.

For example, the FoV estimation unit 210 may be configured to recognize an area in which the target vehicle is not detected by the sensors, or an area in which the target vehicle is detected by the sensors after moving slightly (e.g., less than a predetermined distance), as the FoV boundary area. Further, in the extraction of the object information regarding the target vehicle 2, the FoV estimation unit 210 may be configured to extract the object information regarding the target vehicle 2 from the information acquired by the respective sensors using GPS information regarding the target vehicle 2.

In some cases, in the estimation of the FoVs of the respective sensors, the FoV estimation unit 210 may be configured to estimate the FoV of each sensor by connecting object information which is located in the FoV boundary area, among the extracted object information regarding the target vehicle 2. For example, the estimated FoV may have a polygonal shape, without being limited thereto.

Further, when the FoVs are estimated, the grid cell division unit 220 may be configured to determine the size of the grid cells 30 into which each of the FoVs is divided, and divide each of the FoVs into the grid cells 30 based on the determined size. For example, in determination of the size of the grid cells, the grid cell division unit 220 may be configured to determine the size of the grid cells based on a predetermined set value.

As another example, in determination of the size of the grid cells, the grid cell division unit 220 may be configured to determine the size of the grid cells based on a user input value. As yet another example, in determination of the size of the grid cells, the grid cell division unit 220 may be configured to confirm whether the user input unit is present, and determine the size of the grid cells based on a predetermined set value in response to confirming that the user input value is not present.

Thereafter, in the calculation of the mean errors and error variances of the object information 20, the error calculation unit 230 may be configured to calculate mean errors and error variances of position and speed, among the object information 20. Particularly, the error calculation unit 230 may be configured to calculate a mean error of the object information 20 using an equation $$\mathrm{mean}(x) = \frac{1}{n}\sum_{i=1}^{n} x_i$$

(wherein, mean(x) is the mean error of the object information 20 and $x_i$ is a measurement error).

In addition, the error calculation unit 230 may be configured to calculate an error variance of the object information 20 using an equation $$\mathrm{Var}(x) = \frac{1}{n}\sum_{i=1}^{n} (x_i - \mathrm{mean}(x))^2$$

(wherein, mean(x) is the mean error of the object information 20, $x_i$ is the measurement error, and Var(x) is the error variance of the object information 20). Thereafter, in evaluation of the performances of the sensors, the performance evaluation unit 240 may be configured to collect FoV performance information of the respective sensors based on the calculated mean errors and error variances, and evaluate the accuracies and reliabilities of the respective sensors based on the collected FoV performance information of the respective sensors.

Accordingly, in the present disclosure, the mean errors and error variances of the object information may be calculated based on the grid cells of the FoVs of the respective sensors, and performance evaluation of the various vehicle sensors may be performed based on the same evaluation criteria, thereby being capable of increasing the accuracy and reliability of the information acquired by the sensors. In addition, in the present disclosure, the various sensors may be evaluated based on the same criteria (e.g., the same evaluation environment, performance evaluation unit, and information to be evaluated).

In other words, the present disclosure may assist in setting of design factors in the multiple object tracking method and the sensor fusion method. Further, in the present disclosure, it may be easier to detect the performance and reliability of the sensor based on a specific area. In the present disclosure, when performance of the sensor varies substantial in specific areas, a design factor which varies based on a detection position may be introduced. In addition, in the present disclosure, when the variable design factor is applied, reliability in multiple object tracking and sensor fusion in all areas may be improved.

Figure 4A:
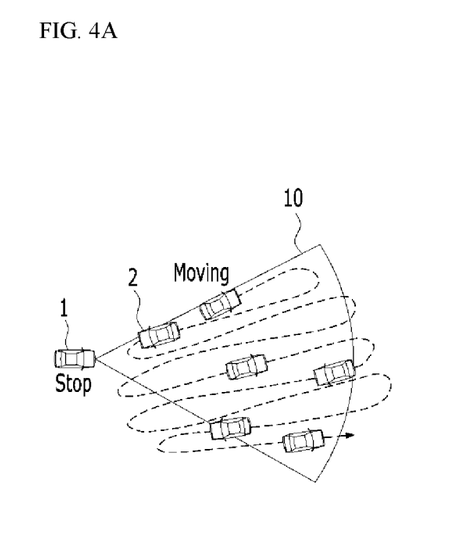
FIGS. 4A-4B and 5 are schematic views illustrating a process for evaluating vehicle sensor performance according to an exemplary embodiment of the present disclosure.
Figure 4B:
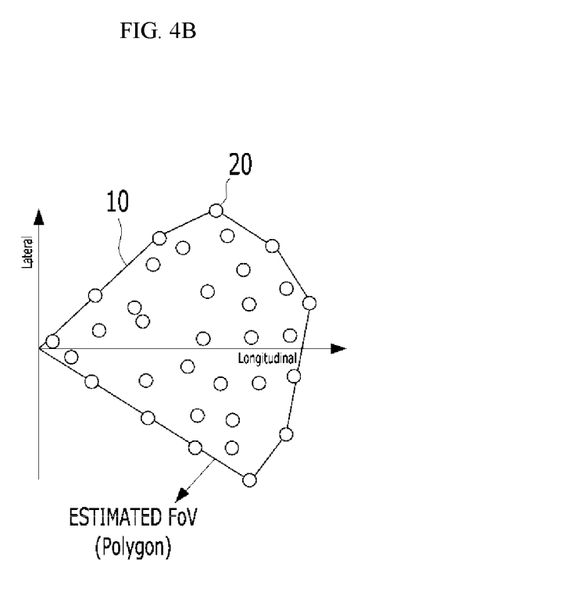
Figure 5:
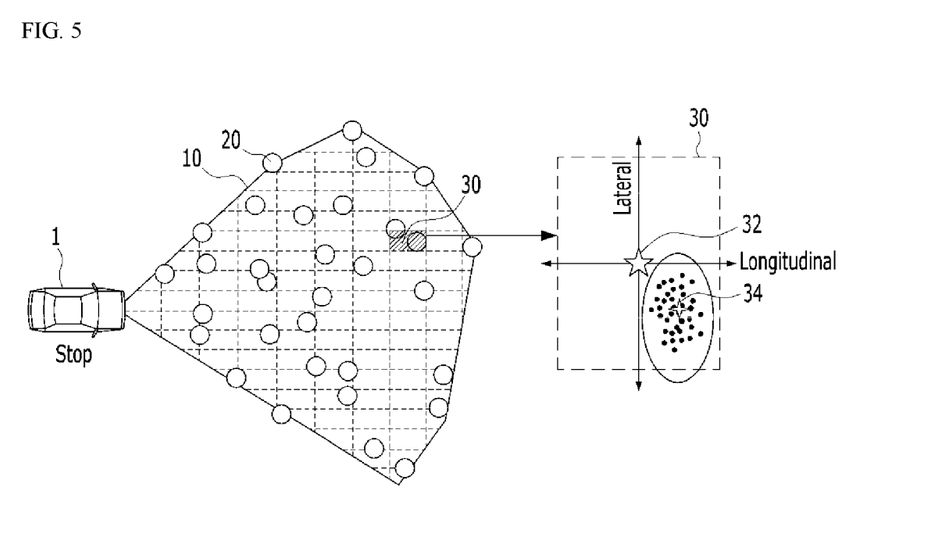

FIGS. 4A-4B and 5 are schematic views illustrating a process for evaluating vehicle sensor performance according to the present disclosure. As shown in FIGS. 4A-4B, the apparatus for evaluating vehicle sensor performance according to the present disclosure may be configured to estimate the FoV of the sensor based on acquired object information.

In the present disclosure, when the sensors mounted within the host vehicle 1 acquire information during movement of the target vehicle 2, the apparatus may be configured to extract object information 20 regarding the target vehicle 2 from the information acquired by the respective sensors, and estimate the FoVs 10 of the respective sensors based on the extracted object information 20 regarding the target vehicle 2. Particularly, the apparatus may be configured to extract the object information 20 regarding the target vehicle 2, which passes FoV boundary areas while moving to all sections estimated to be the FoVs 10 of the respective sensors.

Further, the apparatus for evaluating vehicle sensor performance according to the present disclosure may be configured to estimate the FoVs 10 of the respective sensors by connecting object information 20 which is located in each FoV boundary area, among the extracted object information 20 regarding the target vehicle 2. In particular, the estimated FoV may have a polygonal shape, without being limited thereto.

Thereafter, as shown in FIG. 5, the apparatus may be configured to divide each of the estimated FoVs into a plurality of grid cells 30, collect object information 20 that corresponds to the respective grid cells 30, and calculate mean errors and error variances of the object information 20. The apparatus may be configured to calculate mean errors and error variances of position and speed, among the object information 20.

As an example, object points around a GPS reference point 32 located at the center of each grid cell 30 may be detected. In particular, the apparatus may be configured to calculate a mean error value 34 and an error variance value 36 based on the GPS reference point 32. In the calculation of the mean errors of the object information 20, a mean error of the object information 20 may be calculated using an equation $$\mathrm{mean}(x) = \frac{1}{n}\sum_{i=1}^{n} x_i$$

(wherein, mean(x) is the mean error of the object information 20 and $x_i$ is a measurement error). In addition, in the calculation of the error variance of the object information, an error variance of the object information 20 may be calculated using an equation $$\mathrm{Var}(x) = \frac{1}{n}\sum_{i=1}^{n}(x_i - \mathrm{mean}(x))^2$$

(wherein, mean(x) is the mean error of the object information 20, $x_i$ is the measurement error, and Var(x) is the error variance of the object information 20).

Figure 6A:
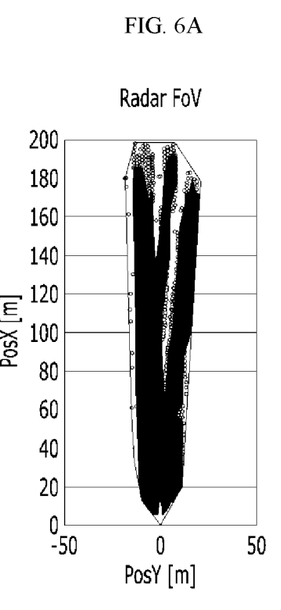
FIGS. 6A-6C are graphs representing FoVs of respective sensors in the method for evaluating vehicle sensor performance according to an exemplary embodiment of the present disclosure.
Figure 6B:
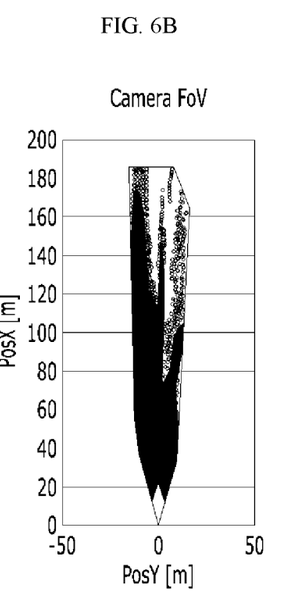
Figure 6C:
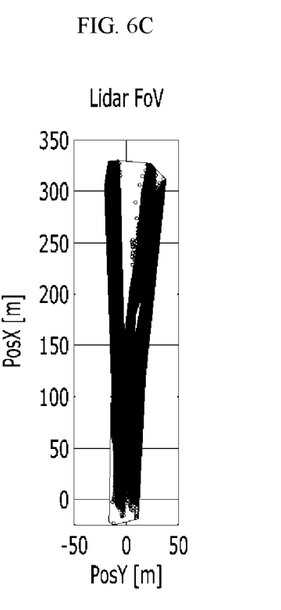

FIGS. 6A-6C are graphs representing FoVs of the respective sensors in the method for evaluating vehicle sensor performance according to the present disclosure. FIGS. 6A-6C represent FoV estimation results of the sensors obtained by acquiring reference object information using RTK-GPS and setting the sensors to be evaluated to a radar, a camera and a lidar. Further, as an evaluation scenario, the number of acquisitions of the scenario was set to about 80 times, an evaluation area was set to an area of a longitudinal distance of about 0-300 m and a lateral distance of about −20-20 m, and the speed of a target vehicle was set to about 20 km/h-about 80 km/h.

As shown in FIG. 6, in the present disclosure, the FoVs are estimated based on data acquired by actual sensors, and thus, FoV areas which are actually usable may be acquired. Therefore, the FoV corresponding to the radar, the FoV corresponding to the camera, and the FoV corresponding to the lidar may be different based on performances of the respective sensors.

Figure 7:
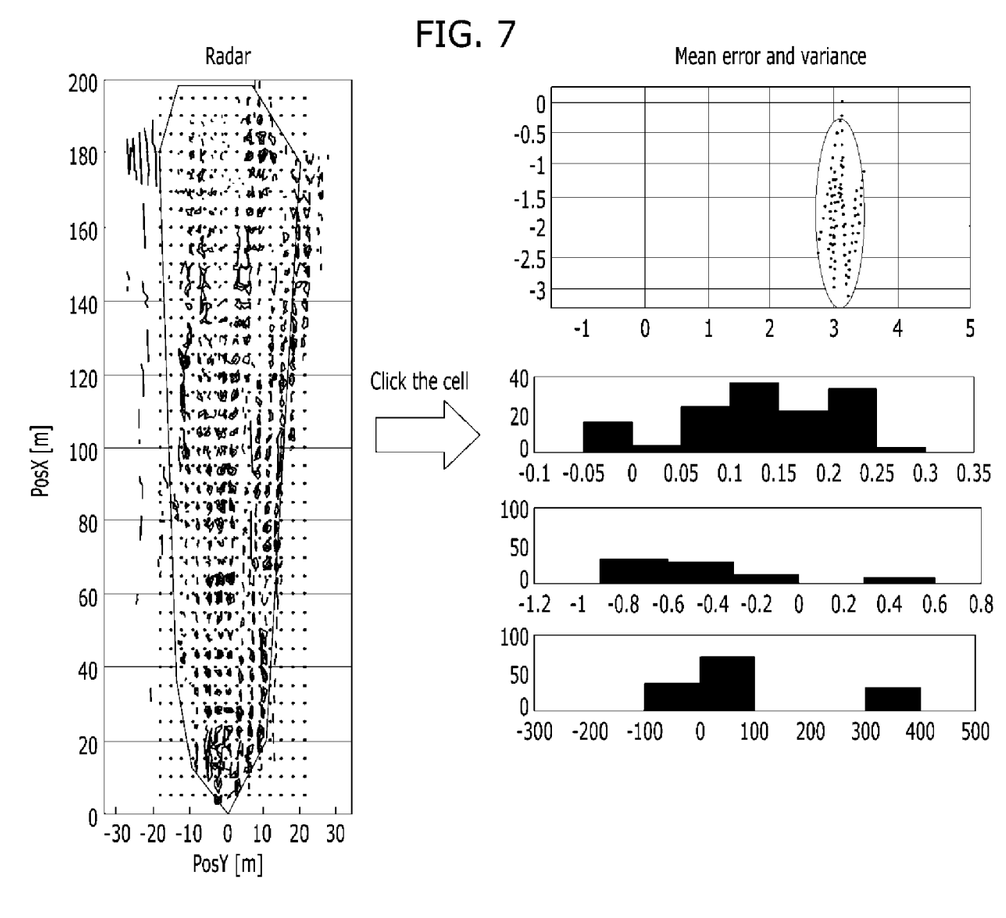
FIG. 7 is graphs representing evaluation performance results of a sensor in the method for evaluating vehicle sensor performance according to an exemplary embodiment of the present disclosure.

FIG. 7 shows a graph representing evaluation performance results of a sensor in the method for evaluating vehicle sensor performance according to the present disclosure. FIG. 7 represents mean errors and error variances of respective grid cells of an FoV area, as performance evaluation results of the radar, serving as a vehicle sensor. As shown in FIG. 7, when one grid cell is selected from the FoV area, a mean error and error variance of the selected grid cell may be detected. Further, in the preset disclosure, accuracy and reliability of the radar may be evaluated based on the mean errors and error variances of the respective grid cells.

Figure 8:
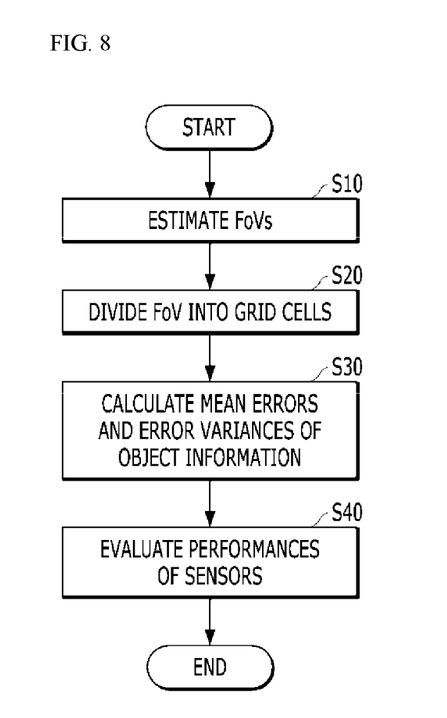
FIG. 8 is a flowchart representing the method for evaluating vehicle sensor performance according to an exemplary embodiment of the present disclosure.

FIG. 8 is a flowchart representing the method for evaluating vehicle sensor performance according to the present disclosure. The method described herein below may be executed by the controller. As shown in FIG. 8, the apparatus may be configured to estimate fields of view (FoVs) of sensors based on acquired object information (S10).

Particularly, in the present disclosure, when a plurality of sensors mounted within a host vehicle acquire information during movement of a target vehicle, object information regarding the target vehicle may be extracted from the information acquired by the respective sensors, and FoVs of the respective sensors may be estimated based on the extracted object information regarding the target vehicle. The FoVs of the sensors may be more accurately extracted when the target vehicle passes FoV boundary areas while moving to all sections estimated to be the FoVs of the respective sensors.

Thereafter, in the present disclosure, each of the estimated FoVs may be divided into a plurality of grid cells (S20). Particularly, in the present disclosure, when the FoVs are estimated, the size of the grid cells 30 into which each of the FoVs is divided may be determined, and each of the FoVs may be divided into the grid cells 20 based on the determined size. Thereafter, in the present disclosure, object information corresponding to the respective grid cells may be collected, and mean errors and error variances of the object information may be calculated (S30).

In the present disclosure, mean errors and error variances of position and speed, among the object information may be calculated. In particular, a mean error of the object information may be calculated using an equation $$\text{mean}(x) = \frac{1}{n}\sum_{i=1}^{n} x_i$$

(wherein, mean(x) is the mean error of the object information and $x_i$ is a measurement error), and an error variance of the object information may be calculated using an equation $$\text{Var}(x) = \frac{1}{n}\sum_{i=1}^{n}(x_i - \text{mean}(x))^2$$

(wherein, mean(x) is the mean error of the object information, $x_i$ is the measurement error, and Var(x) is the error variance of the object information).

Thereafter, in the present disclosure, performances of the sensors may be evaluated based on the calculated mean errors and error variances (S40). In particular, in the present disclosure, FoV performance information of the respective sensors may be collected based on the calculated mean errors and error variances, and accuracies and reliabilities of the respective sensors may be evaluated based on the collected FoV performance information of the respective sensors.

Accordingly, in the present disclosure, the mean errors and error variances of the object information may be calculated based on the grid cells of the FoVs of the respective sensors, and performance evaluation of the various vehicle sensors may be performed based on the same evaluation criteria, thereby being capable of increasing the accuracy and reliability of the information acquired by the sensors. In addition, in the present disclosure, the various sensors may be evaluated based on the same criteria (e.g., the same evaluation environment, performance evaluation unit, and information to be evaluated).

In other words, the present disclosure may assist in setting of design factors in the multiple object tracking method and the sensor fusion method. Further, in the present disclosure, it may be easier to detect the performance and reliability of the sensor depending on a specific area. In the present disclosure, if performance of the sensor varies substantially in specific areas, a design factor which varies depending on a detection position may be introduced.

Further, in the present disclosure, if the variable design factor is applied, reliability in multiple object tracking and sensor fusion in all areas may be improved. In addition, in the present disclosure, a process provided by the method for evaluating vehicle sensor performance may be executed through a non-transitory computer readable recording medium in which a program for executing the method for evaluating vehicle sensor performance using the apparatus for evaluating vehicle sensor performance is recorded.

The above-described method according to the present disclosure may be implemented as non-transitory computer readable code in computer readable recording media in which programs are recorded. Such non-transitory computer readable recording media may include all types of recording media in which data readable by computer systems is stored. As an example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, in an apparatus and method for evaluating vehicle sensor performance according to at least one exemplary embodiment of the present disclosure, performances of various vehicle sensors may be evaluated based on the same evaluation criteria by calculating mean errors and error variances of object information based on grid cells of a field of view of each sensor, to increase accuracy and reliability of information acquired by the sensors.

In addition, in the present disclosure, the various sensors may be evaluated based on the same criteria (e.g., the same evaluation environment, performance evaluation unit, and information to be evaluated). In other words, the present disclosure may assist in setting of design factors in the multiple object tracking method and the sensor fusion method. Further, in the present disclosure, it may be easier to detect the performance and reliability of the sensor based on a specific area. In other words, in the present disclosure, if performance of the sensor varies substantially in specific areas, a design factor which varies depending on a detection position may be introduced. Further, in the present disclosure, if the variable design factor is applied, reliability in multiple object tracking and sensor fusion in all areas may be improved.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An apparatus for evaluating vehicle sensor performance, comprising:
   a memory configured to store program instructions; and
   a processor configured to execute the program instructions, the program instructions when executed configured to:
   estimate field of views (FoVs) of sensors based on acquired object information regarding a target vehicle;
   divide each of the estimated FoVs into a plurality of grid cells;
   collect the object information corresponding to the respective grid cells and calculate mean errors and error variances of the object information; and
   evaluate performances of the respective sensors based on the calculated mean errors and error variances,
   wherein, when the FoVs are estimated and have a polygonal shape, the program instructions when executed are further configured to determine a size of the grid cells into which each of the FoVs is divided, and divide each of the estimated FoVs into the grid cells based on the determined size; and recognize, as an FoV boundary area, an area in which the target vehicle is not detected by the sensors or an area in which the target vehicle is detected by the sensors after moving less than a predetermined distance;

wherein the mean errors and error variances of the object information are calculated by:

detecting object points around a GPS reference point located at a center of each grid cell; and calculating a mean error value and an error variance value based on the GPS reference point.

2. The apparatus according to claim 1, wherein, when a plurality of sensors mounted within a host vehicle acquires information during movement of the target vehicle that is different from the host vehicle, the program instructions when executed are configured to:

extract the object information regarding the target vehicle from the information acquired by the respective sensors, and estimate the FoVs of the respective sensors based on the extracted object information regarding the target vehicle.

3. The apparatus according to claim 2, wherein, in the extraction of the object information about the target vehicle, the program instructions when executed are configured to extract the object information regarding the target vehicle which passes the estimated FoVs of the sensors.

4. The apparatus according to claim 2, wherein, in the extraction of the object information about the target vehicle, the program instructions when executed are configured to extract the object information regarding the target vehicle from the information acquired by the respective sensors using global positioning system (GPS) information regarding the target vehicle.

5. The apparatus according to claim 1, wherein, in the calculation of the mean errors and the error variances of the object information, the program instructions when executed are configured to calculate mean errors and error variances of position and speed, among the object information.

6. The apparatus according to claim 1, wherein the program instructions when executed are configured to calculate the mean error of the object information using an equation:

$$\text{mean}(x) = \frac{1}{n} \sum_{i=1}^{n} x_i,$$

wherein mean(x) is the mean error of the object information and $x_i$ is a measurement error.

7. The apparatus according to claim 1, wherein the program instructions when executed are configured to calculate the error variance of the object information using an equation:

$$\text{Var}(x) = \frac{1}{n} \sum_{i=1}^{n} (x_i - \text{mean}(x))^2,$$

wherein mean(x) is the mean error of the object information, $x_i$ is a measurement error, and Var(x) is the error variance of the object information.

8. The apparatus according to claim 1, wherein, in the evaluation of the performances of the sensors, the program instructions when executed are configured to collect FoV performance information regarding the respective sensors based on the calculated mean errors and error variances, and evaluate accuracies and reliabilities of the respective sensors based on the collected FoV performance information regarding the respective sensors.

9. A method for evaluating vehicle sensor performance in an apparatus for evaluating vehicle sensor performance, comprising:

estimating, by a processor, fields of view (FoVs) of sensors based on acquired object information regarding a target vehicle;

dividing, by the processor, each of the estimated FoVs into a plurality of grid cells;

collecting, by the processor, the object information that corresponds to the respective grid cells and calculating mean errors and error variances of the object information;

evaluating, by the processor, performances of the respective sensors based on the calculated mean errors and error variances, wherein the dividing each of the FoVs into the grid cells includes:

when the FoVs are estimated and have a polygonal shape, determining, by the processor, a size of the grid cells into which each of the FoVs is divided; and dividing, by the processor, each of the estimated FoVs into the grid cells based on the determined size; and recognizing, by the processor, an FoV boundary area as an area in which the target vehicle is not detected by the sensors or an area in which the target vehicle is detected by the sensors after moving less than a predetermined distance;

wherein the mean errors and error variances of the object information are calculated by:

detecting object points around a GPS reference point located at a center of each grid cell; and calculating a mean error value and an error variance value based on the GPS reference point.

10. The method according to claim 9, wherein the estimating the fields of view (FoVs) of the sensors includes:

when a plurality of sensors mounted in a host vehicle acquire information during movement of the target vehicle that is different from the host vehicle, extracting, by the processor, object information regarding the target vehicle from the information acquired by the respective sensors; and estimating, by the processor, the FoVs of the respective sensors based on the extracted object information regarding the target vehicle.

11. The method according to claim 10, wherein, in the extracting the object information about the target vehicle, the object information regarding the target vehicle which passes the estimated FoVs of the sensors is extracted.

12. The method according to claim 10, wherein, in the extracting the object information about the target vehicle, the object information regarding the target vehicle is extracted from the information acquired by the respective sensors using global positioning system (GPS) information regarding the target vehicle.

13. The method according to claim 9, wherein, in the calculating the mean errors and the error variances of the object information, mean errors and error variances of position and speed, among the object information are calculated.

14. The method according to claim 9, wherein, in the calculating the mean errors and the error variances of the object information, the mean error of the object information is calculated using an equation $$\text{mean}(x) = \frac{1}{n}\sum_{i=1}^{n} x_i,$$

wherein mean(x) is the mean error of the object information and $x_i$ is a measurement error.

15. The method according to claim 9, wherein, in the calculating the mean errors and the error variances of the object information, the error variance of the object information is calculated using an equation $$\text{Var}(x) = \frac{1}{n}\sum_{i=1}^{n}(x_i - \text{mean}(x))^2,$$

wherein mean(x) is the mean error of the object information, $x_i$ is a measurement error, and Var(x) is the error variance of the object information.

16. The method according to claim 9, wherein the evaluating the performances of the respective sensors includes:
collecting, by the processor, FoV performance information regarding the respective sensors based on the calculated mean errors and error variances; and
evaluating, by the processor, accuracies and reliabilities of the respective sensors based on the collected FoV performance information regarding the respective sensors.

17. A non-transitory computer readable recording medium having recorded thereon a program to execute the method according to claim 9.

18. A vehicle, comprising:
a sensing apparatus configured to sense object information regarding a target vehicle; and
an apparatus for evaluating vehicle sensor performance configured to evaluate performance of the sensing apparatus by acquiring the object information regarding the target vehicle,
wherein the apparatus for evaluating vehicle sensor performance is further configured to:
estimate field of views (FoVs) of sensors based on the acquired object information;
divide each of the estimated FoVs into a plurality of grid cells;
collect the object information corresponding to the respective grid cells and calculate mean errors and error variances of the object information;
evaluate performances of the respective sensors based on the calculated mean errors and error variances; and
recognize, as an FoV boundary area, an area in which the target vehicle is not detected by the sensors or an area in which the target vehicle is detected by the sensors after moving less than a predetermined distance;
wherein dividing each of the FoVs into the grid cells includes:
when the FoVs are estimated and have a polygonal shape, determining, by the apparatus for evaluating vehicle sensor performance, a size of the grid cells into which each of the FoVs is divided; and
dividing, by the apparatus for evaluating vehicle sensor performance, each of the estimated FoVs into the grid cells based on the determined size;
wherein the mean errors and error variances of the object information are calculated by:
detecting object points around a GPS reference point located at a center of each grid cell; and
calculating a mean error value and an error variance value based on the GPS reference point.

* * * * *